United States Patent
Selkirk, Jr. et al.

(10) Patent No.: US 12,384,731 B2
(45) Date of Patent: *Aug. 12, 2025

(54) BLACK NITROGEN—A MILK-BASED FERTILIZER COMPOSITION WITH A SOLUBLE COAL DUST INGREDIENT

(71) Applicants: William Robert Selkirk, Jr., Cambridge City, IN (US); Rebecca Sue Selkirk, Cambridge City, IN (US); Michael Brown, Carmel, IN (US); Jennifer Xiaoyu Xu Brown, Carmel, IN (US)

(72) Inventors: William Robert Selkirk, Jr., Cambridge City, IN (US); Rebecca Sue Selkirk, Cambridge City, IN (US); Michael Brown, Carmel, IN (US); Jennifer Xiaoyu Xu Brown, Carmel, IN (US)

( * ) Notice: Subject to any disclaimer, the term of this patent is extended or adjusted under 35 U.S.C. 154(b) by 375 days.

This patent is subject to a terminal disclaimer.

(21) Appl. No.: 18/132,388

(22) Filed: Apr. 8, 2023

(65) Prior Publication Data

US 2023/0242462 A1 Aug. 3, 2023

Related U.S. Application Data

(63) Continuation-in-part of application No. 16/511,828, filed on Jul. 15, 2019, now Pat. No. 11,358,906, and a continuation-in-part of application No. 17/739,128, filed on May 8, 2022, now Pat. No. 12,319,631.

(51) Int. Cl.
 *C05F 11/08* (2006.01)
(52) U.S. Cl.
 CPC .................................. *C05F 11/08* (2013.01)
(58) Field of Classification Search
 None
 See application file for complete search history.

(56) References Cited

FOREIGN PATENT DOCUMENTS

CN 105000997 A * 10/2015

* cited by examiner

*Primary Examiner* — Alton N Pryor
(74) *Attorney, Agent, or Firm* — Ritchison Law Offices PC; John D Ritchison

(57) ABSTRACT

A fertilizer composition and method to produced based on milk which comes from ruminant animals like cows and goats and adding a coal dust component. The previous or past milk-based fertilizers have had poor efficacy obtained due to the high fat content of these milk sources due to using too much milk, or rather too much fat in the milk, since the bacteria in the composition will spoil and result in a foul odor, poor growth, and poor crop yield. This fertilizer composition contains a nutrient ingredient, which is the de-fatted milk, as a liquid or dry product, and are utilized between 10 percent weight and 95 percent weight plus uses the coal dust and soluble coal dust as a less expensive stabilizer and chelator as well as other minerals for Nitrogen-Phosphorus-Potassium utilization.

21 Claims, 4 Drawing Sheets

| | SKIM MILK % | HUMIC % And/or Coal Dust * | FULVIC % | CITRIC ACID % | SOIL MICROBES% | L-AMINO ACIDS % | SEAWEED POWDER % | Results Control | Results Invention |
|---|---|---|---|---|---|---|---|---|---|
| 1 | 45 | 20 | 10 | 3 | 2 | 10 | 10 | 152 bu. | 170 bu. |
| 2 | 75 | 5 | 5 | 3 | 2 | 5 | 5 | 152 bu. | 172 bu. |
| 3 | 97 | 0 | 0 | 3 | 0 | 0 | 0 | 152 bu. | 164 bu. |
| 4 | 50 | 10 | 5 | 3 | 2 | 20 | 10 | 152 bu. | 194 bu. |
| 5 | 46 | 12 | 7 | 3 | 2 | 20 | 10 | 152 bu. | 202 bu. |
| 6 | 0 | 12 | 7 | 0 | 0 | 20 | 10 | 152 bu. | 165 bu. |
| 7 | 0 | 0 | 0 | 0 | 0 | 100 | 0 | 152 bu. | 168 bu. |
| 8 | 0 | 0 | 0 | 0 | 0 | 0 | 100 | 152 bu. | 160 bu. |
| 9 | 0 | 0 | 0 | 0 | 100 | 0 | 0 | 152 bu. | 161 bu. |

* Soluble carbon takes typically insoluble coal and grinds it to dust – at less than 5 microns as a cost avoidance for HUMIC % - Cost avoidance.

FIG. 1

Table 1. Corn. Used as side dressed, or 2x2 and sprayed as a foliar at V-4 AND V-5 size.
Per centage shown by weight

|   | SKIM MILK % | HUMIC % And/or Coal Dust * | FULVIC % | CITRIC ACID % | SOIL MICROBES% | L-AMINO ACIDS % | SEAWEED POWDER % | Results Control | Results Invention |
|---|---|---|---|---|---|---|---|---|---|
| 1 | 45 | 20 | 10 | 3 | 2 | 10 | 10 | 42 bu. | 52 bu. |
| 2 | 75 | 5 | 5 | 3 | 2 | 5 | 5 | 42 bu. | 49 bu. |
| 3 | 97 | 0 | 0 | 3 | 0 | 0 | 0 | 42 bu. | 48 bu. |
| 4 | 50 | 10 | 5 | 3 | 2 | 20 | 10 | 42 bu. | 58 bu. |
| 5 | 46 | 12 | 7 | 3 | 2 | 20 | 10 | 42 bu. | 69 bu. |
| 6 | 0 | 12 | 7 | 0 | 2 | 20 | 10 | 42 bu. | 49 bu. |
| 7 | 0 | 0 | 0 | 0 | 0 | 100 | 0 | 42 bu. | 44 bu. |
| 8 | 0 | 0 | 0 | 0 | 0 | 0 | 100 | 42 bu. | 44 bu. |
| 9 | 0 | 0 | 0 | 0 | 100 | 0 | 0 | 42 bu. | 50 bu. |

\* Soluble carbon takes typically insoluble coal and grinds it to dust — at less than 5 microns as a cost avoidance for HUMIC % - Cost avoidance.

FIG. 2

Table 2. Soy Bean. *Used as side dressed and sprayed as a foliar at 4" height. Per centage shown by weight*

| | SKIM MILK % | HUMIC % And/or Coal Dust * | FULVIC % | CITRIC ACID % | SOIL MICROBES% | L-AMINO ACIDS % | SEAWEED POWDER % | Results Invention as % Greater Than Control |
|---|---|---|---|---|---|---|---|---|
| 1 | 45 | 20 | 10 | 3 | 2 | 10 | 10 | 12% |
| 2 | 75 | 5 | 5 | 3 | 2 | 5 | 5 | 12% |
| 3 | 97 | 0 | 0 | 3 | 0 | 0 | 0 | 11% |
| 4 | 50 | 10 | 5 | 3 | 2 | 20 | 10 | 15.5% |
| 5 | 46 | 12 | 7 | 3 | 2 | 20 | 10 | 22.5% |
| 6 | 0 | 12 | 7 | 3 | 2 | 20 | 10 | 12% |
| 7 | 0 | 0 | 0 | 0 | 0 | 100 | 0 | 12% |
| 8 | 0 | 0 | 0 | 0 | 0 | 0 | 100 | 8% |
| 9 | 0 | 0 | 0 | 0 | 100 | 0 | 0 | 9% |

\* Soluble carbon takes typically insoluble coal and grinds it to dust – at less than 5 microns as a cost avoidance for HUMIC % - Cost avoidance.

FIG. 3

Table 3. Vegetables. Used as irrigation drip weekly and sprayed as a foliar at 4" heights.
*Per centage shown by weight*

|   | SKIM MILK % | HUMIC % And/or Coal Dust * | FULVIC % | CITRIC ACID % | SOIL MICROBES% | L-AMINO ACIDS % | SEAWEED POWDER % | Results Invention as % Greater Than Control |
|---|---|---|---|---|---|---|---|---|
| 1 | 45 | 20 | 10 | 3 | 2 | 10 | 10 | 18% |
| 2 | 75 | 5 | 5 | 3 | 2 | 5 | 5 | 15% |
| 3 | 97 | 0 | 0 | 3 | 0 | 0 | 0 | 9% |
| 4 | 50 | 10 | 5 | 3 | 2 | 20 | 10 | 21% |
| 5 | 46 | 12 | 7 | 3 | 2 | 20 | 10 | 28% |
| 6 | 0 | 12 | 7 | 0 | 0 | 20 | 10 | 8% |
| 7 | 0 | 0 | 0 | 0 | 0 | 100 | 0 | 9% |
| 8 | 0 | 0 | 0 | 0 | 0 | 0 | 100 | 5% |
| 9 | 0 | 0 | 0 | 0 | 100 | 0 | 0 | 7% |

\* Soluble carbon takes typically insoluble coal and grinds it to dust – at less than 5 microns as a cost avoidance for HUMIC % - Cost avoidance.

FIG. 4

Table 4. Pasture Grasses (Cool, Warm Season and Hay).
Foliar sprayed 30 days before first cutting and 10 days following each cutting.
Percentage shown by weight

BLACK NITROGEN—A MILK-BASED FERTILIZER COMPOSITION WITH A SOLUBLE COAL DUST INGREDIENT

CROSS-REFERENCE TO RELATED APPLICATIONS

This application is a Second Continuation-in-Part [C.I.P.] filed under 37 CFR 1.53(b) and claims the benefit of the original, non-provisional U.S. patent application Ser. No. 16/511,828, which was submitted Jul. 15, 2019, which was published as US 2020/0024203 A1 on Jan. 23, 2020, which was issued on Jun. 14, 2022 as an U.S. Pat. No. 11,358,906 B2 and is maintained and active. The First patent entitled "Black Nitrogen—A milk-based fertilizer," was submitted by William Robert Selkirk, Jr and Rebecca Sue Selkirk. This current application is a Second Continuation-in-Part [C.I.P.] filed under 37 CFR 1.53(b) with U.S. patent application Ser. No. 17/739,128 which was submitted May 8, 2022, was published as US 2022/0267227 on Aug. 25, 2022, and is active and ready for examination in Technology Center 1616. The Second CIP is entitled as "Black Nitrogen—A Milk-Based Fertilizer Composition with a Soluble Coal Dust Ingredient," was submitted by William Robert Selkirk, Jr., Rebecca Sue Selkirk, Michael Brown, and Jennifer (Xiaoyu) Brown. The original application and the First Continuation-In-Part (CIP) submitted, are incorporated fully by reference as if they were reproduced here, verbatim. The original application claimed the benefit of United States Provisional Patent Application with Ser. No. 62/764,219 filed Jul. 23, 2018, and entitled the same name as the publication.

FIELD OF INVENTION

This invention relates to a Black Nitrogen—A Milk-Based Fertilizer Composition with a Soluble Coal Dust ingredient. Particularly, this invention relates to Certified Organic Fertilizers. Namely, USDA NOP DOES NOT ALLOW, UNDER CIVIL AND CRIMINAL PENALTY, the use of UREA for Certified Organic Crops. This invention is the first fertilizer composition to utilize milk (namely bovine, but not just limited to bovine. The milk source can be goat, sheep, etc.) to produce and use Milk Urea Nitrogen as an approved natural source of Urea for Organic Crop Production.

This invention is directed to fertilizers and methods for using a milk base and other organic materials thereby converting them into useful inorganic-organic nutrient fertilizers. Since the original filing of the application, the applicants have endeavored to find a more cost-effective method of replacing the costly humic acid (the Soluble Carbon Source) which is very expensive ($6.00/pound versus 60 cents for soluble carbon dust) and limits the use of this overall product lines. Hence, there has been developed another carbon source that can be converted to soluble. The present invention relates to a method for producing organic fertilizer from a milk base and milk urea nitrogen. This invention relates generally to the field of organic fertilizers and compositions having utility as chelating agents and biodegradable chelating agents. This invention particularly relates to chelating agents having utility in agriculture and particularly in fertilizers. This invention relates to water-soluble macro and/or micronutrient organic fertilizers, to a process for their manufacture, and to their use for plant fertilization in agricultural, especially horticultural, settings.

FEDERALLY SPONSORED RESEARCH

None.

SEQUENCE LISTING OR PROGRAM

None.

BACKGROUND—FIELD OF INVENTION AND PRIOR ART

As far as known, there are no milk-based fertilizer Composition with Coal Dust or soluble coal dust that are currently or in prior art used in agriculture as a source of amino acid-based nitrogen, phosphorus, potassium and calcium for soil, drip irrigation, and foliar applications. The current application is for a fertilizer derived from dairy milk and stabilized with various stabilizers to prevent spoilage and nitrogen enhancing ingredients with plant pathogen reduction benefits. It also has as a component micronized Coal Dust or soluble coal dust to reduce the overall cost without sacrificing effectiveness. It is believed that this fertilizer product is unique in its design and technologies utilized to improve and enhance fertilizers.

BACKGROUND

Dairy Milk from ruminant animals such as cows, goats, etc., have been used for centuries for fertilizer and pesticides. The poor efficacy previously was due to the high fat content of these milk sources. Along with the benefits of using milk fertilizer, one must include its drawbacks. These include: using too much milk, or rather too much fat in the milk. This is not a good idea since the bacteria in it will spoil, resulting in a foul odor and poor growth (or crop yield).

Milk contains several antimicrobial activities including naturally occurring antimicrobial agents. For instance, it contains lactoferrin and lysozyme, and other antimicrobial factors, especially those produced because of microbial and probiotic activities. Lysozyme as an example is a bacteriologic enzyme naturally present in milk. Lysozyme can also inhibit growth of Gram-positive spoilage organisms and pathogens, including *Listeria* and *Bacillus cereus*. It also inhibits plant pathogens and downy mildew on crops. The enzyme lactoperoxidase, naturally present in raw milk, adds thiocyanate and a source of peroxide. The effect is to block bacterial metabolism and inhibit pathogen growth. Lactoferrin (Lf) is a therapeutic alternative against pathogens since it is a safe nutraceutical protein commercially available from milk whey, no resistance to it has been found. And lactoferrin does not affect the microbiota (Good Bacteria). [Source: Luna-Castro S, Samaniego-Barrón L, Serrano-Rubio L E, Ceballos-Olvera I, Avalos-Gómez C, et al. (2017) *Lactoferrin: A Powerful Antimicrobial Protein Present in Milk*. J Adv Dairy Res 5: 195. DOI: 10.4172/2329-888X.1000195].

Since the original filing of the application, the applicants have endeavored to find a more cost-effective method of replacing humic acid with coal dust (and now Soluble Carbon Source—soluble coal dust) which is very expensive and limits the use of this overall product lines. Hence, there has been developed another carbon source that can be converted to a soluble state. The solubility of carbon is very important, as crops and plants cannot utilize insoluble carbon to the level of soluble carbon. Importantly, as a foliar application, insoluble carbon does not spray evenly on plant and tree leaves well, leaving the plants with concentrated areas of insoluble carbon which in turn can burn the leaves and even reduce yield. Extreme concentrations of the insoluble carbon may even result in death of the plant/tree.

As further background one notes: The full form of pH is Potential of Hydrogen. The term pH is known as the negative logarithm of H+ ion concentration. Hence the meaning of the name pH is explained as the strength of hydrogen. Thus, pH describes the concentration of the hydrogen ions in a solution, and it is the indicator of acidity or basicity of the solution. In simplistic terms, pH is a measure of how acidic/basic the solution is. The range is from 0-14, with 7 being neutral. A pH reading of less than 7 indicates acidity, whereas a pH of greater than 7 indicates a base/alkalinity. Therefore, the pH value or reading is really a measure of the relative amount of free hydrogen and hydroxyl ions in the water.

One also notes: Coal is a heterogeneous, carbonaceous rock formed by the natural decomposition of plant matter at elevated temperature and pressure in the earth's crust. Thus 'coal dust,' itself is often a heterogeneous by-product of the mining and use of coal. Coal exists in various forms, ranging from lignite and brown coals (soft coals) to bituminous coals and anthracite (hard coals). Most classification schemes for coal were developed for geological and commercial reasons; the various schemes apply different weights to the many different chemical and physical properties of coal. Consequently, classifications vary widely and differ in different countries. The principal use for coal is for power generation, which accounted for 88% of total consumption in 1993 in the United States and 66% of total consumption in 1991 in the European Union.

Further one notes that Micronization processes for the coal may vary from grinding, pulverizing, impact pulverizing, milling, and even using fluid streams that intersect and then by impacting the particles against a rotating cone. Once the micronization is achieved, the coal dust is used to replace the humic acid. A significant savings results since currently the humic acid ranges essentially Six dollars ($6.00) a pound where coal dust is essentially forty to sixty cents a pound in bulk supply (less than one dollar a pound).

Problem Solved

This invention relates to Certified Organic Fertilizers. Namely, USDA NOP DOES NOT ALLOW, UNDER CIVIL AND CRIMINAL PENALTY, the use of UREA for Certified Organic Crops. This invention is the first Urea base Certified for organic fertilizers. It utilizes milk (namely bovine, but not just limited to bovine. The milk source can be goat, sheep, etc.) to use Milk Urea Nitrogen as an approved natural source of Urea for Organic Crop Production. Avoiding the high fat content of milk sources as a base for agricultural fertilizers. Overcoming the poor efficacy due to the high fat content of these milk sources. Along with this, avoiding the use of too much fat in the milk wherein the bacteria in it will spoil, resulting in a foul odor and poor growth (or crop yield). It also provides a slow release (non-petroleum and non-toxic) chelator or "claw" to enable metal-based nutrients and result in improved crop yields.

PRIOR ART

A novelty search was performed which showed no similar prior art that anticipates the Black Nitrogen—A Milk-Based Fertilizer Composition with Coal Dust. The search of prior art revealed:

A. Application CN104961530 is a patent application submitted in 2012 called a Technique for preparing fertilizer from milk. The invention discloses a technique for preparing fertilizer from milk, which comprises the following steps: preparing materials, fusing, fermenting, diluting, uncovering, taking out the supernatant black liquid fertilizer in the cylinder body, adding water for dilution to obtain the fertilizer which can be directly used, supplementing ferrous sulfate, pig manure and river water in the cylinder body, stirring and continuing fermentation. The technique disclosed by the invention enhances the utilization ratio of degenerative milk and reduces the loss of the dairy farmer. Due to abundant nutrients in the milk, the fermented liquid fertilizer is beneficial to absorption of plants and is suitable for growth of multiple vegetables and flowers.

B. Application CN102627483 is an application submitted in 2012 called an Organic concentrated nutrient solution special for flowers and potted landscapes and preparation method thereof. The invention relates to organic concentrated nutrient solution special for flower and potted landscapes and a preparation method thereof. The preparation method mainly comprises the following steps of: (1) uniformly mixing milk, soybean milk, common salt and a fermentation agent according to a weight ratio of 10-30:10-40:1-3:1-5 and then placing in a fermentation tank, and fermenting at normal temperature for 20-40 days to obtain fermentation broth A; (2) uniformly mixing animal dung, water and the fermentation agent according to a weight ratio of 30-40:10-20:1-5 and then placing in the fermentation tank, fermenting at the normal temperature for 30-60 days and discarding residue to obtain fermentation broth B; and (3) mixing the fermentation broth A and the fermentation broth B according to a weight ratio of 1:0.8-1 and filling. The preparation method of the organic concentrated nutrient solution is simple; the raw materials are low in cost and readily available; a product is natural, organic, safe, and pollution-free; peculiar smell is not produced after application; the nutrient content is high, and the nutrition is complete; and the organic concentrated nutrient solution has high pertinence to nutritional requirement of potted plants.

C. Application CN106495766 is a patent application submitted in 2016 called a Soybean milk and milk mixed organic fertilizer for planting of Huapi cumquat. The invention relates to soybean milk and milk mixed organic fertilizer for planting of Huapi cumquat. The organic fertilizer comprises fermented soybean milk, fermented milk, and water by weight ratio of 1:1:(6-8). As the organic fertilizer has high content of protein and amino acid, Huapi cumquat planted by the organic fertilizer has smooth and bright peels, good taste, and high nutrition value, and meets standards of top-quality Huapi cumquat.

D. Application CN104145618 is a patent application submitted in 2014 called The use of Chinese milk vetch paddy straw and fertilizer to improve the yield of a double-crop rice. The present invention discloses a method belonging to the technical field of agricultural production yield cultivation fertilizer using paddy straw and Chinese milk vetch fertilizer method of increasing the yield of a double cropping. During the growth of a particular rice, using fresh milk vetch plowing Field replacing part of nitrogen during the growth of rice, using rice straw to replace part of nitrogen, the nitrogen in a double cropping goal introspection entire production cycle, high yield. The present invention fallow fields in the southern area of paddy field cropping systems to solve our country is facing expansion, decline in soil quality paddy, rice production increased ecological cost, low fertilizer use efficiency and other issues, is an increase in double-crop rice production, reducing fertilizer inputs, increase fertilizer one kind of utilization while providing high yield, nitrogen province, cultivation techniques reduce N2O emissions.

E. Application CN1774986 is a patent application submitted in 2005 called a Rice field milk vetch cultivating method for saving cost and increasing production. The present invention discloses a Chinese milkvetch cultivation method in rice field, and relates to a Chinese milkvetch cultivation and utilization technique under the condition of paddy field rice-green fertilizer rotation cropping system. It is characterized by inter sowing Chinese milkvetch seeds in the rice field, and adopting a series of measures of channeling and discharging water after the rice is harvested to implement said invention.

F. Application CN104081997 is a patent application submitted in 2014 called a High Yield planting method for milk vetch. The invention discloses a high yield planting method for milk vetch. The high yield planting method for the milk vetch comprises the steps of seed treatment, sowing, field management, disease and pest prevention and harvesting. The high yield planting method can promote healthy growth of the milk vetch and prevent the milk vetch from being attacked by diseases and pests. The milk vetch planted through the method grows fast, and is good in quality, rich in nutrient and high in edibleness.

G. Application CN1307126 is a patent application submitted in 2004 called a Leaf Fertilizer with milk as a solvent. In milk as a solvent belonging fertilizer foliar feed. The present invention is to provide a foliar fertilizer comprising nutrients solvent. Milk is a foliar fertilizer in a solvent, characterized in that zinc sulfate 2-6%, 6-10% sodium borate, 6-10% manganese sulfate, ammonium molybdate 10-16%, 4-10% copper sulfate, sulfite 12-24% iron, 24-60% milk can be uniformly mixed; or 10-15% amino acid, zinc sulfate 1-3%, 3-5% borate, 3-5% manganese sulfate, ammonium molybdate 5-8%, 2-5% copper sulfate, ferrous sulfate, 7-12%, 47-60% milk can be uniformly mixed; or 8-10% humic acid, zinc sulfate 2-5%, 5-8% borax, sulfuric acid 5-8% manganese, 8-12% ammonium molybdate, 4-8% copper sulfate, ferrous sulfate, 12-20%, 39-56% milk can be uniformly mixed.

SUMMARY OF THE INVENTION

This invention is fertilizer composition and method to compose the same. The fertilizer compositions that contain a nutrient ingredient, which is the de-fatted milk, as a liquid or dry material, and are utilized at between 40 percent weight and 95 percent weight and are a stabilizer and chelator for Nitrogen-Phosphorus-Potassium utilization, as well as other known crop minerals. Preferably, the stabilizer is between about five percent by weight (5% wt.) and about ten percent by weight (10% wt.) of the fertilizer composition. Preferably the fertilizer has at least six percent by weight (6% wt.) as nitrogen content. The change and modification in this latest fertilizer composition uses coal dust and now soluble coal dust, a much less expensive carbon base, to replace or supplement the Humic Acid—a higher cost component. The effectiveness and improvements with the coal dust replacement improve the economic position of the Black Nitrogen—A Milk-Based Fertilizer Composition with a Soluble Coal Dust ingredient. The key to this change is using the micronized coal dust to achieve the needed solubility of the entire mixture of the composition and ensure complete absorption by the plants.

The newly invented Black Nitrogen—A Milk-Based Fertilizer Composition with a Soluble Coal Dust ingredient can be produced at low volumes by very simple processes and in high volume production by more complex and controlled process systems.

Objects and Advantages

There are several objects and advantages of the Black Nitrogen—A Milk-Based Fertilizer Composition with a Soluble Coal Dust ingredient. There are currently no known agricultural fertilizer products that are effective at providing the objects of this invention.

The Black Nitrogen—A Milk-Base Fertilizer Composition with a Soluble Coal Dust ingredient has various advantages and benefits that are presented as different products depending on the change of percentages of the noted ingredients. The advantages are:

| Item | |
|---|---|
| | Advantages—from Black Amino Acids |
| 1 | Stimulates protein synthesis for plant development and growth |
| 2 | Maximizes protein content of crops and pastures |
| 3 | Enhances stress resistance and recovery |
| 4 | Optimizes chlorophyll concentration, sugar, and nutritional content |
| 5 | Optimizes the release and mobilization of plant nutrients |
| 6 | Improves chelation and permeability |
| 7 | Promotes flowering and fruiting |
| | Advantages—from Black biologies Above ground |
| 8 | Chelates macro and micronutrients into plant available forms |
| 9 | Augments the efficacy and efficiency of fertilizers |
| 10 | Improves mineral content of soils |
| 11 | Increases protein content of crops |
| 12 | Optimizes seed germination, plant development and resilience |
| 13 | Introduces, feeds, and stimulates beneficial soil microbes |
| 14 | Enhances soil structure, aeration, and water retention |
| | Advantages—from Black biologics/Underground |
| 15 | Improves number of tubers per plant |
| 16 | Increases the size and weight of tubers per plant |
| | Advantages—from Black Inoculant |
| 17 | Has 250 BILLION CFU/# of beneficial soil microbes |
| 18 | Fixes atmospheric Nitrogen into plant available form |
| 19 | Solubilizes Phosphorus to enhance "P" uptake by plants |
| 20 | Enhances Phosphorus availability and reduces "P" loss |
| 21 | Optimizes the release and mobilization of plant nutrients |

| Item | |
|---|---|
| 22 | Stimulates enzymes that regulate plant growth and development |
| 23 | Improves beneficial root colonization to maximize nutrient uptake |
| | Advantages—from Black Nitro (CA Plus) |
| 24 | Has ease of uptake and absorption by crops since Milk is derived Nitrogen |
| 25 | Has Microbes to convert, fixate and solubilize nutrients in plant available forms |
| 26 | Provides Humic/Fulvic/Coal Dust acids that chelate nutrients and augment the efficacy of fertilizers |
| 27 | Has Kelp to provide key minerals, vitamins and growth enhancers and resilience |
| 28 | Optimizes sugar and nutritional content from the Milk and plant L-Amino acids |
| 29 | Fosters and optimizes flowering and fruit setting |
| 30 | Enhances photosynthesis for lush, green, healthy plants |
| | Advantages—from Sea Milk |
| 31 | Provides key minerals, vitamins, and enzymes for plant growth |
| 32 | Enhances photosynthesis for succulent, green, healthy plants |
| 33 | Stimulates root development and crop enlargement |
| 34 | Optimizes flowering and fruit setting. Prevents bloom abortions |
| 35 | Optimizes the release and mobilization of plant nutrients |
| 36 | Increases plant resilience to environmental and pathogenic stresses |
| 37 | Stimulates protein synthesis and overall quality of crops |
| | Advantages—from Seed Boost |
| 38 | Accelerates seed germination |
| 39 | Improves establishment and development of seedlings |
| 40 | Maximizes seed and seedling resilience to stress |
| 41 | Stimulates root growth and development |
| 42 | Enhanced drought resistance |
| 43 | Optimized Nitrogen fixation and solubilization of Phosphorus |
| | Advantages—Why Milk Generally |
| 44 | Increases Protein and BRIX content of crops |
| 45 | Contains in the Milk several antimicrobial activities including naturally occurring antimicrobial agents, for instance, lactoferrin and lysozyme, and other antimicrobial factors especially those produced because of microbial and probiotic activities. Lysozyme for example is a bacteriologic enzyme naturally present in milk. |
| 46 | Can inhibit (by the Lysozyme) growth of Gram-positive spoilage organisms and pathogens, including *Listeria* and *Bacillus cereus*. It also inhibits plant pathogens and downy mildew on crops. |
| 47 | Adds, through the enzyme lactoperoxidase that is naturally present in raw milk, thiocyanate, and a source of peroxide. The effect is to block bacterial metabolism and inhibit pathogen growth. |
| 48 | Provides Lactoferrin (Lf) which is a therapeutic alternative against pathogens since it is a safe nutraceutical protein commercially available from milk whey, no resistance to it has been found, and it does not affect the microbiota (Good Bacteria). |
| | Advantages—Why Coal Dust Generally |
| 49 | Provides a significant cost reduction in that Coal Dust is essentially fifty to sixty cents ($0.50-0.60 or estimate at most $1.00 a pound) versus humic acid at essentially $6.00 a pound. |
| 50 | Replaces or supplements humic acid (the Soluble Carbon Source) as another carbon source that can be converted to soluble. |

Finally, other advantages and additional features of the present Black Nitrogen—A Milk-Based Fertilizer Composition with a Soluble Coal Dust ingredient will be more apparent from the accompanying full description of the fertilizer product. For one skilled in the art of agricultural fertilizers, it is readily understood that the features shown in the examples with this fertilizer product are readily adapted to other types of milk-based fertilizer products. However, it important to comment that without significant experimentation and discovery of the ability to micronize the coal dust to achieve solubility, the replacement of the Humic acid in the fertilizer composition would not be achieved. A person having ordinary skill in the art of fertilizers generally and milk-based fertilizers particularly would not find it obvious to first use the milk-base and then (now) to replace the humic acid with micronized coal dust.

DESCRIPTION OF THE DRAWINGS—FIGURES/TABLES

The accompanying drawings, which are incorporated in and constitute a part of this specification, illustrate the results Tables for the Black Nitrogen—A Milk-Based Fertilizer Composition with Coal Dust. These sketches of the Results Tables together with the summary description given above and a detailed description given below explain the principles of the Black Nitrogen—A Milk-Based Fertilizer Composition with Coal Dust. It is understood, however, that the full scope of the process is not limited to only the precise arrangements and instrumentalities shown.

FIG. 1 is Table 1—Corn, used as side dressed, or 2×2 and sprayed as a foliar at V-4 AND V-5 size.

FIG. 2 is Table 2—Soy Bean, used as side dressed and sprayed as a foliar at 4″ height.

FIG. 3 is Table 3—Vegetables, used as irrigation drip weekly and sprayed as a foliar at 4″ heights.

FIG. 4 is Table 4—Pasture Grasses (Cool, Warm Season and Hay), foliar sprayed 30 days before first cutting and 10 days following each cutting.

DETAILED DESCRIPTION OF PREFERRED EMBODIMENT

The present development is a Black Nitrogen—A Milk-Based Fertilizer and relates to a Black Nitrogen—A Milk-Based Fertilizer Composition with Coal Dust. Particularly, this invention relates to Certified Organic Fertilizers. Namely, USDA NOP DOES NOT ALLOW, UNDER CIVIL AND CRIMINAL PENALTY, the use of UREA for Certified Organic Crops. This invention is the first, to utilize milk (namely bovine, but not just limited to bovine. The milk source can be cows, goats, sheep, camels, water buffaloes, yaks, buffaloes/bison, etc.) to use Milk Urea Nitrogen as an approved natural source of Urea for Organic Crop Production. This invention is directed to fertilizers and methods for using a milk base and other organic materials thereby converting them into useful inorganic-organic nutrient fertilizers. The present invention relates to a method for producing organic fertilizer from a milk base and milk urea nitrogen. This invention relates generally to the field of organic fertilizers and compositions having utility as chelating agents and biodegradable chelating agents. This invention particularly relates to chelating agents having utility in agriculture and particularly in fertilizers. This invention relates to water-soluble macro and/or micronutrient organic fertilizers, to a process for their manufacture, and to their use for plant fertilization in agricultural, especially horticultural, settings.

The advantages for the Black Nitrogen—A Milk-Based Fertilizer Composition with a Soluble Coal Dust ingredient are listed above in the introduction. Succinctly the benefits are that the milk-based fertilizer mixture with Coal Dust:

A. 'Advantages'

Advantages—from Black Amino Acids
  (1) Stimulates protein synthesis for plant development and growth
  (2) Maximizes protein content of crops and pastures
  (3) Enhances stress resistance and recovery
  (4) Optimizes chlorophyll concentration, sugar, and nutritional content
  (5) Optimizes the release and mobilization of plant nutrients
  (6) Improves chelation and permeability
  (7) Promotes flowering and fruiting Advantages—from Black Biologics Above Ground
  (8) Chelates macro and micronutrients into plant available forms
  (9) Augments the efficacy and efficiency of fertilizers
  (10) Improves mineral content of soils
  (11) Increases protein content of crops
  (12) Optimizes seed germination, plant development and resilience
  (13) Introduces, feeds, and stimulates beneficial soil microbes
  (14) Enhances soil structure, aeration, and water retention Advantages—from Black Biologics/Underground
  (15) Improves number of tubers per plant
  (16) Increases the size and weight of tubers per plant Advantages—from Black Inoculant
  (17) Has 250 BILLION CFU/# of beneficial soil microbes
  (18) Fixes atmospheric Nitrogen into plant available form
  (19) Solubilizes Phosphorus to enhance "P" uptake by plants
  (20) Enhances Phosphorus availability and reduces "P" loss
  (21) Optimizes the release and mobilization of plant nutrients
  (22) Stimulates enzymes that regulate plant growth and development
  (23) Improves beneficial root colonization to maximize nutrient uptake Advantages—from Black Nitro (CA Plus)
  (24) Has ease of uptake and absorption by crops since Milk is derived Nitrogen
  (25) Has Microbes to convert, fixate and solubilize nutrients in plant available forms
  (26) Provides Humic/Fulvic acids that chelate nutrients and augment the efficacy of fertilizers
  (27) Has Kelp to provide key minerals, vitamins and growth enhancers and resilience
  (28) Optimizes sugar and nutritional content from the Milk and plant L-Amino acids
  (29) Fosters and optimizes flowering and fruit setting
  (30) Enhances photosynthesis for lush, green, healthy plants Advantages—from Sea Milk
  (31) Provides key minerals, vitamins, and enzymes for plant growth
  (32) Enhances photosynthesis for succulent, green, healthy plants
  (33) Stimulates root development and crop enlargement
  (34) Optimizes flowering and fruit setting. Prevents bloom abortions
  (35) Optimizes the release and mobilization of plant nutrients
  (36) Increases plant resilience to environmental and pathogenic stresses
  (37) Stimulates protein synthesis and overall quality of crops Advantages—from Seed Boost
  (38) Accelerates seed germination
  (39) Improves establishment and development of seedlings
  (40) Maximizes seed and seedling resilience to stress
  (41) Stimulates root growth and development
  (42) Enhanced drought resistance
  (43) Optimized Nitrogen fixation and solubilization of Phosphorus Advantages—why Milk Generally
  (44) Increases Protein and BRIX content of crops
  (45) Contains in the Milk several antimicrobial activities including naturally occurring antimicrobial agents, for instance, lactoferrin and lysozyme, and other antimicrobial factors especially those produced because of microbial and probiotic activities. Lysozyme for example is a bacteriologic enzyme naturally present in milk.
  (46) Can inhibit (by the Lysozyme) growth of Gram-positive spoilage organisms and pathogens, including *Listeria* and *Bacillus cereus*. It also inhibits plant pathogens and downy mildew on crops.
  (47) Adds, through the enzyme lactoperoxidase that is naturally present in raw milk, thiocyanate, and a source of peroxide. The effect is to block bacterial metabolism and inhibit pathogen growth.
  (48) Provides Lactoferrin (Lf) which is a therapeutic alternative against pathogens since it is a safe nutraceutical protein commercially available from milk whey, no resistance to it has been found, and it does not affect the microbiota (Good Bacteria).

Advantages—why Coal Dust Generally
  (49) Provides a significant cost reduction in that Coal Dust is essentially fifty to sixty cents ($0.50-0.60 or estimate at most $1.00 a pound) versus humic acid at essentially $6.00 a pound.
  (50) Replaces or supplements humic acid (the Soluble Carbon Source) as another carbon source that can be converted to soluble.

Sources:

B. The approved sources of Nitrogen for Certified Organic Farms, as enforced by USDA NOP ARE THE FOLLOWING:
  1) Chilean Nitrate fifteen to sixteen percent (15-16%) Nitrogen. A good source of Nitrogen but is it not readily available for plant absorption. This slow uptake prevents higher yields. Conventional farms being able to use UREA can experience 200-250 bu. Of corn per acre. The slow-release Chilean Nitrate (Sodium Nitrate, chemical name) can only provide about 150 Bu. Per Acre of corn.

2) Chicken Feather Meal Thirteen to fifteen percent (13-15%) Nitrogen, is good as well for slow-release scenarios. But is not quickly absorb in the early stage of crop production (Young plants coming out of the soil.

3) Livestock Manures and Fish Emulsions. Usually around three to six percent (3-6%) Nitrogen, but again, slow released. These are all slow released due to their nature, which is soil microbes must break them down into usable Nitrogen for the plant.

The preferred and alternative embodiments of the Black Nitrogen—A Milk-Based Fertilizer Composition with Coal Dust is shown below. The preferred embodiment is a fertilizer comprising Nitrogen, Phosphorus, Potassium, Calcium, and other beneficial minerals derived from Whole Milk, Skim Milk, and or Dehydrated Milk from any ruminant animal (cows, goats, sheep, camels, water buffaloes, yak, buffaloes/bison, etc.) containing proteins, urea nitrogen, phosphorus, potassium, and various minerals. Wherein, if whole milk, or any other milk with fat contained therein, the fat must be removed, and preservatives are added, either in the liquid fat free milk, or dehydrated skim milk powder. However, it is understood that the embodiments of this invention are not limited to types of soil, or methods of applying fertilizer compositions to soil, which can vary and are understood by skilled artisans.

All of the embodiments of the fertilizer compositions contain a nutrient ingredient, derived from milk-based products. In a preferred embodiment, the nutrient ingredient is bovine based milk that has been 'de-fatted' and de-hydrated into one percent (1%) FAT skim milk powder. The fertilizer compositions preferably contain between about fifty percent by weight (50%) de-fatted milk and about fifty percent by weight (50) nutrient ingredient(s), which can be compromised but not limited to, the following and any combination of the following: Humic Acid and/or Micronized Coal Dust, Fulvic Acid, Seaweed Extract (in forms including powder), Silica, Organically approved Organic Acids (list found on USDA SITE Ex: Vinegar, acetic acid five percent (5%), Organically Approved Minerals (Found on USDA NOP SITE) and soil microbes and enzymes approved for organic use and NON-GMO certified.

Stabilizer and Chelator

In some inventions, the fertilizer composition comprises a high-carbon polymer as a stabilizer. Although, in a preferred embodiment, the stabilizer is not petroleum, nor synthetic based. It is Certified Organic Humic and Fulvic Acids. Certified Organic is defined by USDA 7 CFR 201.305. When humic and fulvic acids are used that are Certified Organic, then the chance of improper contamination is reduced and available for Certified Organic Farms, as well. The humic acid is a Nitrogen Stabilizer, meaning it retains available nitrogen in the soil for longer periods of time. Since the realization of humic substance biological benefits by Lydia Khristeva nearly seventy years ago, humic substances have been researched extensively to elucidate their natural benefits to plants. In collaboration with microbial bio-fertilizers like mycorrhizae, great advances in plant and soil health have been achieved. Humic substances are subdivided into three fractions: humic acid, fulvic acid, and humin. These divisions are based on the solubility of each fraction in the presence of different pH levels.

Humic acids consist of weak aliphatic chains and aromatic rings that are soluble in water under alkaline conditions yet will precipitate out of solution in acidic conditions around a pH of 2. The molecular size of most humic acids falls within the molecular weights range of 10,000 to 100,000. Humic acids can readily form salts with trace mineral elements. Naturally occurring humic acids typically have approximately 60 mineral elements present, all bound to the humic acid molecule in a way that can be readily utilized by various living organisms. The availability of metal ions bound to humic acid is due in part that the elements have already been assimilated and chelated by microorganisms that utilized parent organic matter many years prior. The change and modification in this latest fertilizer composition uses coal dust, a much less expensive carbon base, to replace the described Humic Acid—a higher cost component. The effectiveness and improvements with the coal dust replacement improve the economic position of the Black Nitrogen—A Milk-Based Fertilizer Composition now with Coal Dust. The key to this change is using the micronized coal dust to achieve the needed solubility of the entire mixture of the composition and ensure complete absorption by the plants.

Fulvic acids share many similarities with humic acids yet possess significant differences that alter their behavior. Fulvic acids are smaller in comparison to humic acids, usually below 10,000 to a minimum of 1000. Fulvic acids are the organic fraction that is soluble in both alkaline and acidic aqueous solutions. In comparison to their larger counterparts, fulvic acids exhibit a greater total acidity, greater number of carboxyl groups, and higher adsorption and cation exchange capacities than humic acids. Fulvic acids also show no evidence of methoxy groups, few phenol groups, and are less aromatic compared to humic acids extracted from the same source. Due to their smaller size, fulvic acids can pass more easily through micropores of biological or artificial membrane systems than humic acids and can remain in soil solution even at high salt concentrations and at a wide range of pH. With its resilience to soil extremes, fulvic acids have long-lasting potential to interact with plant roots.

Humins are the last group of humic substances. In terms of solubility, they are insoluble in water at any pH. Humins are significantly larger than humic and fulvic acids having approximate molecular weights ranging from 100,000 to 10,000,000. Of the three fractions, humin is the most resistant to decomposition. Although humin is only partially understood, it is understood that humin functions to improve water holding capacity in soil, to improve soil structure, to maintain soil stability, to function as a cation exchange system, and to generally improve soil fertility. These functions of humin make it a vital component of fertile soils.

Humic substances are primarily extracted from leonardite. Leonardite is the richest source of humic substances compared to other humic sources. Leonardite is the product of the humification process that lasts approximately 70 million years. Other sources of humic substances such as peat complete the process within a few thousand years but are not as bioactive. Leonardite's biological activity is approximately five times stronger than any other humic matter. To put it in perspective, one liter of liquid concentrate humic acid from leonardite is equivalent to 7-8 metric tons of organic manure and one kilogram of powdered concentrate humic acid is equivalent to about 30 metric tons of manure. This currently provides a significant cost reduction in that Coal Dust is essentially fifty to sixty cents ($0.50-0.60 or estimate at most $1.00 a pound) versus humic acid at essentially $6.00 a pound.

Humic acid, as a chelator, serves as a receptor or binding site for micronutrient exchange between the nutrient and the root zone of the plant. Calcium, iron, copper, manganese, zinc, and several other micronutrients can chelate in this way and be provided to the plant. Compared to synthetic chelating agents, such as EDTA, humic acids provide some extra benefits. Humic acid is an organic product of microbial decomposition that utilizes parent biota from many years prior. This familiarity allows humic acid to pass freely throughout plants allowing for easy delivery of needed nutrients and can remain inside the plant. Fulvic acids have greater total acidity, greater numbers of carboxyl groups, and higher adsorption and cation exchange capacities than humic acid. Fulvic acid chelates more ions than humic acid in most other cases. Fulvic acid's ability to chelate nutrients provides for its multitude of beneficial effects reported in the literature. Enhanced uptake of N, P, K, Ca, Mg, Cu, Fe and Zn has been reported. Increased nitrogen content was reported. Amino Acids are fundamental in the process of protein synthesis. Plants absorb Amino Acids through stomas and is proportional to ambient temperature. Increases Protein Synthesis (makes higher protein in crops). Reduces stress from nature and draught. Better Photosynthesis-Increases chlorophyll allowing more absorption on light. Stomas-Amino Acid, L-Glutamic favors the opening of stomas longer period of times, offering better absorption on foliar nutrients. L-Amino Acids have a chelating effect on micronutrients, making absorption and transportation of micronutrients inside the plant easier.

When a stabilizer/chelator is part of the fertilizer compositions, the fertilizer preferably contains between about five to thirty percent by weight (5-30% wt.) humic or fulvic acid as a stabilizer/chelator, more preferably about twenty five percent by weight (25% wt.).

Additional Ingredients

The components of the fertilizer compositions can further be combined with various additional ingredients suitable for fertilizer compositions. Particularly suitable additional ingredients benefit the soil condition and plants grown in the soil. In other embodiments, additional functional ingredients may be included in the fertilizer compositions. The functional ingredients provide desired properties and functionalities to the compositions. To this application, the term "functional ingredient" includes a material that when added provides a beneficial property in a particular use. Some particular examples of functional materials are discussed in more detail below, although the particular materials discussed are given by way of example only. A number of other additional ingredients may be added to the fertilizer compositions without departing from the invention.

Additional Fertilizers

The fertilizer compositions can optionally include an additional fertilizer. Any commercially available fertilizers can be added to the compositions. Additional fertilizers can be selected depending on the target soil or as a foliar based on sap or tissue sampling. The fertilizer compositions can preferably contain between about zero percent by weight (0% wt.) and about ninety five percent by weight (95% wt.) additional fertilizer.

Additional Nutrients

The fertilizer compositions can optionally include additional nutrients. Suitable nutrients include, but are not limited to, macronutrients containing nitrogen, phosphorus, potassium, calcium, magnesium, and sulfur, and micronutrients containing molybdenum, zinc, boron, cobalt, copper, iron, manganese, and chloride. Different nutrients can be used, depending on the target soil or tissue/sap testing results. The fertilizer compositions can contain between about zero percent by weight (0% wt.) and about ninety percent by weight (90% wt.) additional nutrients.

Micro-Organisms

The fertilizer compositions can optionally include microorganisms. Fertilizers containing microorganisms are referred to as bio-fertilizers. Suitable micro-organisms include, but are not limited to, fungi, archaea, and bacteria. Micro-organisms can be beneficial as they can supply nutrients to plants symbiotically. Different compositions of fungi, archaea and bacteria may be used, depending on the target soil.

A particularly beneficial fungi is the arbuscular mycorrhizal fungi, which expresses the glycoprotein glomalin on their hyphae and spores. These fungi are members of the phyla Glomeromycota. This protein helps to bind soil particles together and is responsible for good soil tilth. When introduced into this invention, the fungi will express glomalin within the humic/fulvic pores and aid in maintaining good soil structure by binding the humic/fulvic to soil particles. Additionally, the root structure provided by the hyphae allows nutrients to penetrate in and out of the high surface area environment provided by this invention. The fertilizer compositions can contain between zero percent by weight (0% wt.) and about five percent by weight (5% wt.) microorganisms, preferably between about One tenth a percent by weight.

pH Adjusters

It has been long been recognized that soil pH is an important variable in maintaining soil health and productivity. Soil pH tends to modify the bioavailability of plant nutrients. Some soils are inherently acidic or basic in nature and a soil amendment needs to consider its effect on soil acidity. Citric acid derived from fermentation (Certified Organic Rules) may be used. Soil pH can be managed in other ways. One way of managing soil pH is to add pH adjusting compounds directly to the soil before and/or after application of the fertilizer compositions. Another way of managing soil pH is to add pH adjusters directly to the fertilizer compositions. Many pH adjusters can be added to the fertilizer compositions, including neutralizers, acidifying agents, alkalizing agents, and/or buffering agents.

Pesticides

The fertilizer compositions can contain between about zero percent by weight (0% wt.) and about twenty percent by weight (20% wt.) pesticides and herbicides of choice. The preferred pesticide is made from a carrier, skim milk at or under one percent (1%) fat content. And any active ingredient listed on 40 CFR 152.25 (Table 1) which identifies the EPA list of 'exempt' active ingredients for pest control. The one or combination of items on the list 40 CFR 152.25 (Table 1) shall be determined from environmental pest pressures. 40 CFR 152.25 (Table 2) identifies exempt 'Inert' ingredients. When this list is purchased as 'Certified Organic' this invention also allows a pesticide that is Certified Organic or 'Approved for Organic Use.' Other known synthetic pesticides and herbicides are not allowed for Organic Farming Use.

Compositions

The fertilizer compositions can be any suitable form, including, but not limited to, granular, pellets, particulate, powder, or in liquid form by adding water. In some embodiments, the fertilizer compositions can be a form having controlled release properties. Compositions are substantially free of synthetic materials to allow this invention to be used as a Certified Organic Product.

Solubility of Coal Dust in General

Solubilizing coal dust is one of the most recognized ratios for microbial growth and hence healthier and more yielding crops is the carbon connection. As a person moves forward and work towards increasing soil health, microbial activity, and organic matter content, that person must understand how the Carbon to Nitrogen ratio works. The C:N ratio is the mass of carbon to the mass of nitrogen in a particular substance. For example, if one has a C:N ratio of 24:1, this means there is 24 units of carbon to 1 unit of nitrogen. This C:N ratio is very important to fertilizer and soil additives because the ratio has a direct impact on residue decomposition and also nitrogen cycling in treatment and fertilization of soils.

The optimum C:N ratio is 24:1 for desired decomposition of most crop residue. The ratio 24:1 is the proper carbon and nitrogen that a microorganism must have in order sustain its health. A typical microorganism living in the soil has a C:N ratio of about 8:1; this is what that microorganism must maintain in its bodies. For optimum health, the microbe requires approximately 16 parts of carbon for energy and then 8 parts for maintenance. This energy and maintenance combination is where the ratio of 24:1 comes from.

When selecting a cash/growth crop and cover crop rotation it is important that the selector/farmer take into consideration the C:N ratio of certain plants that the farmer may want to include in the rotation. This is especially true if the amount of chemical residue on the surface is a concern when planting time comes around. As a rule of thumb, the higher the ratio, the longer it takes for the material to decompose. Likewise, the smaller the ratio is, the more rapidly the plant material will decompose. This also has a direct relationship with the amount of nitrogen that is tied up in the soil that will be available to the next growing plant.

The reason it takes longer for the higher C:N ratio residue to decompose is because the further away from 24:1 one gets, then the more nitrogen the microbe must find from other sources in the soil. The microbes will reach out and pull all available nitrogen from the soil that is necessary to reach its optimum ratio of 24:1. This reverse surge taking the nitrogen leads to the excess nitrogen in the soil to be tied up (immobilization) and may lead to a deficit until some microbes die and then release the nitrogen (immobilization) or until other sources of nitrogen are provided. Now just because a certain crop has a high C:N ratio, it does not automatically mean it is a bad thing. It simply means that the farmer must be aware of what is taking place in the soils and be aware that some adjustments are needed to be made in the operation to account for the additional nitrogen tie up.

A crop that has a lower C:N ratio, like legumes, will allow the decomposition to take place rather quickly as the excess nitrogen becomes available in the soil for other growing plants. This is what allows the farmer to begin to consider reducing his nitrogen rates once there is a well-established, properly managed system, and once the farmer truly understands how to utilize that nitrogen. As decomposition takes time, the value of using coal dust (as a carbon source) is its high level of carbon. Bituminous coal contains 45%-86% carbon. Bituminous coal in the United States is between 100 million and 300 million years old. Bituminous coal is the most abundant rank of coal found in the United States. The major drawback of using it is that coal is insoluble in water. So, when coal dust is added itself to soil, takes many years to breakdown and microbes cannot digest it.

This present invention of using soluble carbon takes typically insoluble coal and grinds it to dust—at less than 5 microns. This reduction to dust allows the coal to have much more surface area to be treated. The preferred treatment is first using 5-micron coal dust and mixing it with a strong alkali. In chemistry, an alkali is a basic, ionic salt of an alkali metal or an alkaline earth metal. An alkali can also be defined as a base that dissolves in water. A solution of a soluble base has a pH greater than 7.0. The adjective alkaline, and less often, alkalescent, is commonly used in English as a synonym for basic, especially for bases soluble in water. This broad use of the term is likely to have come about because alkalis were the first bases known to obey the Arrhenius definition of a base, and they are still among the most common bases. This said invention mixes water and basic salt to a range of 10-13 on the pH Scale. It is then heated to 500 F until dried. Then it is mixed with acid water solution. An acid is a molecule or ion capable of either donating a proton (i.e., hydrogen ion, $H^+$), known as a Bronsted-Lowry acid, or forming a covalent bond with an electron pair, known as a Lewis acid. The first category of acids are the proton donors, or Bronsted-Lowry acids. In the special case of aqueous solutions, proton donors form the hydronium ion $H_3O^+$ and are known as Arrhenius acids. Bronsted and Lowry generalized the Arrhenius theory to include non-aqueous solvents. A Bronsted or Arrhenius acid usually contains a hydrogen atom bonded to a chemical structure that is still energetically favorable after loss of $H^+$.

The Arrhenius Acids are preferred. Mixed with water, to a range no higher than 3.0 pH and no lower than 1.0 pH is preferred. Once said coal dust less than 5 micron dries, it is not soluble in water and other aqueous solutions. This makes the soluble coal dust (45-86% carbon) easily digested by soil microbes and a quicker adjustment in the soils to achieve ideal C:N ratio or 24:1.

The details mentioned here are exemplary and not limiting. Other specific components and manners specific to describing a Black Nitrogen—A Milk-Based Fertilizer may be added as a person having ordinary skill in the field of the art of agricultural fertilizers and compositions and their uses well appreciates.

Operation of the Preferred Embodiment

The Black Nitrogen—A Milk-Based Fertilizer Composition with Coal Dust has been described in the above embodiment. The manner of how the process operates and several examples are described below. One notes well that the description above and the operation described here must be taken together to fully illustrate the concept of the Black Nitrogen—A Milk-Based Fertilizer. The preferred and alternative embodiments of the Black Nitrogen—A Milk-Based Fertilizer is shown below. The preferred embodiment is a fertilizer comprising Nitrogen, Phosphorus, Potassium, Calcium, and other beneficial minerals derived from Whole Milk, Skim Milk, and or Dehydrated Milk from any ruminant animal (cows, goats, sheep, camels, water buffaloes, yaks, buffaloes/bison, etc.) containing proteins, urea nitrogen, phosphorus, potassium, and various minerals. Wherein, if whole milk, or any other milk with fat contained therein, the fat must be removed, and preservatives are added, either in the liquid fat free milk, or dehydrated skim milk powder. However, it is understood that the embodiments of this invention are not limited to types of soil, or methods of applying fertilizer compositions to soil, which can vary and are understood by skilled artisans.

Methods of Preparing the Compositions

The fertilizer compositions of the present invention can be prepared in many ways. Methods of preparing the fertilizer compositions include, but are not limited to, extrusion, molding, pelletizing, casting, pressing and mechanical mixing. The compositions can be prepared by preparing the nutrient ingredient, then mixing the nutrient ingredient with various stabilizers and chelators. Preferred stabilizers and chelators are noted in this invention, but other types may be used. Additional ingredients may be added simultaneously or subsequently and mixed. Once the desired composition is mixed the compositions can be prepared in the desired physical form.

Improvements and Additions with this Application Using Coal Dust
(See notes in Background and Description, above, as to Coal Dust and solubility.)

Since the original filing of the application, the applicants have endeavored to find a more cost-effective method of replacing humic acid (the Soluble Carbon Source) which is very expensive and limits the use of this overall product lines. Hence, there has been developed another carbon source that can be converted to soluble.

The solubility of carbon is very important, as crops and plants cannot utilize insoluble carbon to the level of soluble carbon. Importantly, as a foliar application, insoluble carbon does not spray evenly on plant and tree leaves well, leaving the plants with concentrated areas of insoluble carbon which in turn can burn the leaves and even reduce yield. Extreme concentrations of the insoluble carbon may even result in death of the plant/tree.

Micronization of coal dust is performed and ensures the particles sizes are in the range of 0.1 to 1.0 micron in size. This micronization achieves both better absorption by the plants through both soil applications, as well as foliar applications. The micronized coal dust particles then reacted with any of the Hydroxyl Group to result in a range of 10-13 pH. After drying, the particles are then blended with multiple acid groups to a 1-3 pH. After drying the particles are then blended with cationic surfactant and dried one last time. It is then ground up or pelletized. The ground up particles are then available to use for this fertilizer replacing soluble humic acid.

Methods of Using Compositions.

The fertilizer compositions can be applied to a surface, including, but not limited to, soil, soilless plant growing medium, or any medium where a plant may be grown, such as pastures, crops of all types, trees, scrubs, bushes, lawns, flower beds, gardens, or containerized substrates, in any desired manner. An advantage of the fertilizer compositions is that they can be readily spread in traditional manners without the need to mix them with the soil or on a surface. However, the fertilizer compositions can also be applied in a manner where they are mixed with the surface. For example, the fertilizer composition can be mixed with soil or a compost of choice. In another aspect of the invention, the fertilizer composition can be blended into a substrate for use in a soilless growth medium. The fertilizer compositions can be applied with agricultural machinery suitable for different environments.

Machinery includes, but is not limited to, manure or fertilizer spreaders; plowing equipment, such as rotary hoes, disc harrows, chisels, et cetera; banding methods. In another aspect, the fertilizer compositions may be mixed with manure, compost, or lime, or mixed with water or liquid manure and applied as a slurry. It can also be mixed with topsoil or simply spread on top of a surface such as a lawn, agriculture field, flower bed, garden, or containerized substrate. Or it can be mixed with water and foliar sprayed on agriculture plant species, or through drip irrigation, or broad cast sprayed on the soil.

Examples: Nutrient Analysis and Results

For all the following examples shown, the following conditions apply: Notes:
(A) Microbes are comprised of 250 Billion CFU/# (*Bacillus megaterium, Bacillus subtilis, Bacillus licheniformis, Bacillus simplex*, Brasiliense, N-FIXING Microbes, *Bacillus pumilus, Bacillus amyloliquefaciens Streptomyces lydicus*, and *Trichoderma harzianum*).
(B) L-Amino Acid: L-Aspartic Acid (10%), L-Threonine (3%), L-Serine (5%), L-Glutamic Acid (14%), L-Proline (5%), Glycine (10%), L-Alanine (5%), L-Cystine (1%), L-Valine (5%) L-Methionine (2%), L-Isoleucine (4%), L-Leucine (9%), L-Tyrosine (3%), L-Phenylalanine (5%), L-Lysine (10%), L-Histidine (2%) and L-Arginine (7%).
(C) Seaweed powder is water soluble and derived from the species Ascophyllum nodosum.
(D) Soil was fertilized based on Albrecht Methods of soil balance as the control.

FIG. 1 is Table 1. Corn. Used as side dressed, or 2×2 and sprayed as a foliar at V-4 AND V-5 size.

| SKIM MILK % | HUMIC and/ or Coal Dust % | FULVIC % | CITRIC ACID % | SOIL MICROBES % | L-AMINO ACIDS % | SEAWEED POWDER % | Results Control | Results Invention |
|---|---|---|---|---|---|---|---|---|
| 45 | 20 | 10 | 3 | 2 | 10 | 10 | 152 bu. | 170 bu. |
| 75 | 5 | 5 | 3 | 2 | 5 | 5 | 152 bu. | 172 bu. |
| 97 | 0 | 0 | 3 | 0 | 0 | 0 | 152 bu. | 164 bu. |
| 50 | 10 | 5 | 3 | 2 | 20 | 10 | 152 bu. | 194 bu. |
| 46 | 12 | 7 | 3 | 2 | 20 | 10 | 152 bu. | 202 bu. |
| 0 | 12 | 7 | 3 | 2 | 20 | 10 | 152 bu. | 165 bu. |
| 0 | 0 | 0 | 0 | 0 | 100 | 0 | 152 bu. | 168 bu. |
| 0 | 0 | 0 | 0 | 0 | 0 | 100 | 152 bu. | 160 bu. |
| 0 | 0 | 0 | 0 | 100 | 0 | 0 | 152 bu. | 161 bu. |

* Soluble carbon takes typically insoluble coal and grinds it to dust - at less than 5 microns.

FIG. 2 is Table 2. Soybean. Used as side dressed and sprayed as a foliar at 4" height.

| SKIM MILK % | HUMIC and/ or Coal Dust % | FULVIC % | CITRIC ACID % | SOIL MICROBES % | L-AMINO ACIDS % | SEAWEED POWDER % | Results Control | Results Invention |
|---|---|---|---|---|---|---|---|---|
| 45 | 20 | 10 | 3 | 2 | 10 | 10 | 42 bu. | 52 bu. |
| 75 | 5 | 5 | 3 | 2 | 5 | 5 | 42 bu. | 49 bu. |
| 97 | 0 | 0 | 3 | 0 | 0 | 0 | 42 bu. | 48 bu. |
| 50 | 10 | 5 | 3 | 2 | 20 | 10 | 42 bu. | 58 bu |
| 46 | 12 | 7 | 3 | 2 | 20 | 10 | 42 bu. | 69 bu. |
| 0 | 12 | 7 | 3 | 2 | 20 | 10 | 42 bu. | 49 bu. |
| 0 | 0 | 0 | 0 | 0 | 100 | 0 | 42 bu. | 44 bu. |
| 0 | 0 | 0 | 0 | 0 | 0 | 100 | 42 bu. | 44 bu. |
| 0 | 0 | 0 | 0 | 100 | 0 | 0 | 42 bu. | 50 bu. |

*Soluble carbon takes typically insoluble coal and grinds it to dust - at less than 5 microns.

| SKIM MILK % | HUMIC and/ or Coal Dust % | FULVIC % | CITRIC ACID % | SOIL MICROBES % | L-AMINO ACIDS % | SEAWEED POWDER % | Results Invention As % more than control |
|---|---|---|---|---|---|---|---|
| 45 | 20 | 10 | 3 | 2 | 10 | 10 | 12 |
| 75 | 5 | 5 | 3 | 2 | 5 | 5 | 12 |
| 97 | 0 | 0 | 3 | 0 | 0 | 0 | 11 |
| 50 | 10 | 5 | 3 | 2 | 20 | 10 | 15.5 |
| 46 | 12 | 7 | 3 | 2 | 20 | 10 | 22.5 |
| 0 | 12 | 7 | 3 | 2 | 20 | 10 | 12 |
| 0 | 0 | 0 | 0 | 0 | 100 | 0 | 12 |
| 0 | 0 | 0 | 0 | 0 | 0 | 100 | 8 |
| 0 | 0 | 0 | 0 | 100 | 0 | 0 | 9 |

*Soluble carbon takes typically insoluble coal and grinds it to dust - at less than 5 microns.

FIG. 4 is Table 4. Pasture Grasses (Cool, Warm Season and Hay). Foliar sprayed 30 days before first cutting and 10 days following each cutting. There was a total of 4 cuttings. The results of each were combined and the average of total crop is noted.

| SKIM MILK % | HUMIC and/ or Coal Dust % | FULVIC % | CITRIC ACID % | SOIL MICROBES % | L-AMINO ACIDS % | SEAWEED POWDER % | Results Invention As % more yield than control |
|---|---|---|---|---|---|---|---|
| 45 | 20 | 10 | 3 | 2 | 10 | 10 | 18 |
| 75 | 5 | 5 | 3 | 2 | 5 | 5 | 15 |
| 97 | 0 | 0 | 3 | 0 | 0 | 0 | 9 |
| 50 | 10 | 5 | 3 | 2 | 20 | 10 | 21 |
| 46 | 12 | 7 | 3 | 2 | 20 | 10 | 28 |
| 0 | 12 | 7 | 3 | 2 | 20 | 10 | 8 |
| 0 | 0 | 0 | 0 | 0 | 100 | 0 | 9 |
| 0 | 0 | 0 | 0 | 0 | 0 | 100 | 5 |
| 0 | 0 | 0 | 0 | 100 | 0 | 0 | 7 |

*Soluble carbon takes typically insoluble coal and grinds it to dust - at less than 5 microns.

Results show that all four of the studies indicated better results with skim milk alone. But the properties of the skim milk applications performed better when stabilizers and chelators were administered.

The above specification provides a description of the manufacture and use of the disclosed compositions and methods. Since many embodiments can be made without departing from the spirit and scope of the invention, the invention resides in the claims.

With this description it is to be understood that the Black Nitrogen—A Milk-Based Fertilizer Composition with Coal Dust is not to be limited to only the disclosed embodiment of product. The features of the milk-based fertilizer mixture are intended to cover various modifications and equivalent arrangements included within the spirit and scope of the description.

The embodiments of this invention are not limited to particular types of soil, or methods of applying fertilizer compositions to soil, which can vary and are understood by skilled artisans. It is further to be understood that all terminology used herein is for the purpose of describing embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. The description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. Various features and aspects of the disclosed embodiments can be combined with or substituted for one another to form varying modes of the disclosed inventions. Thus, it is intended that the scope of at least some of the present inventions herein disclosed should not be limited by the disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any embodiment, feature, or combination of features shown herein. This is true even if only a single embodiment of the feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed considering the number of recited significant digits and by applying ordinary rounding techniques.

The present invention contemplates modifications as would occur to those skilled in the art. While the disclosure has been illustrated and described in detail in the figures and the foregoing description, the same is to be considered as illustrative and not restrictive in character, it being understood that only selected embodiments have been shown and described and that all changes, modifications and equivalents that come within the spirit of the disclosures described heretofore and or/defined by the following claims are desired to be protected.

What is claimed is:

1. A milk-based fertilizer composition prepared by a process comprising: removing any amount of a fat with a defatting process from a quantity of a milk, obtained from a ruminant animal, to make an amount of skim milk a main nutrient ingredient, the skim milk comprising between 40 and 97 percent by weight of the milk-based fertilizer composition; adding an amount of a citric acid to the skim milk, the amount of citric acid consists essentially of 3 percent by weight of the milk-based fertilizer composition; mixing an amount of a chelate substance by weight of the milk-based fertilizer composition whereby the chelate substance is a combination of a fulvic acid and a mixture of a coal dust and soluble coal dust
   wherein the milk-based fertilizer composition contains Nitrogen, Phosphorus, Potassium, and Calcium and whereby the milk-based fertilizer composition further contains proteins, urea nitrogen, and at least one mineral.

2. The milk-based fertilizer composition of claim 1 further comprising a seaweed powder comprising between 5 and 10 percent by weight of the milk-based fertilizer composition whereby a performance of the milk-based fertilizer composition as measured by a crop yield is increased.

3. The milk-based fertilizer composition of claim 2 wherein the seaweed powder is selected from a group consisting of a red marine alga, a green marine alga, and a brown marine alga.

4. The milk-based fertilizer composition of claim 1 further comprising an additive of at least one L-Amino Acid whereby a performance of the milk-based fertilizer composition as measured by a crop yield is increased.

5. The milk-based fertilizer composition of claim 4 whereby the at least one L-Amino Acid is selected from a group consisting of L-Aspartic Acid, L-Threonine, L-Serine, L-Glutamic Acid, L-Proline, Glycine, L-Alanine, L-Cystine, L-Valine L-Methionine, L-Isoleucine, L-Leucine, L-Tyrosine, L-Phenylalanine, L-Lysine, L-Histidine and L-Arginine.

6. The milk-based fertilizer composition of claim 1 further comprising a soil microbe comprising between 0 and 2 percent by weight of the milk-based fertilizer composition whereby a performance of the milk-based fertilizer composition as measured by a crop yield is increased.

7. The milk-based fertilizer composition of claim 6 wherein the soil microbe is selected from a group consisting of *Bacillus megaterium, Bacillus subtilis, Bacillus licheniformis, Bacillus simplex, Brasiliense*, N-FIXING Microbes, *Bacillus pumilus, Bacillus amyloliquefaciens Streptomyces lydicus*, and *Trichoderma harzianum*.

8. A milk-based fertilizer composition of claim 1 further containing urea nitrogen and at least one mineral whereby a performance of the milk-based fertilizer composition as measured by a crop yield is increased.

9. The milk-based fertilizer composition of claim 8 wherein the at least one mineral is selected from a group consisting of sulfur, cobalt, iron, sodium, copper, manganese, magnesium, molybdenum, and zinc.

10. The milk-based fertilizer composition of claim 1 wherein the defatting process is selected from a group consisting of defatting the milk with a centrifuge and defatting the milk with a cream separation machine.

11. A milk-based fertilizer composition prepared by a process comprising: removing any amount of a fat with a defatting process from a quantity of a milk, obtained from a ruminant animal, to make an amount of skim milk a main nutrient ingredient, the skim milk comprising between 40 and 97 percent by weight of the milk-based fertilizer composition; adding an amount of a citric acid to the skim milk, the amount of citric acid consists essentially of 3 percent by weight of the milk-based fertilizer composition; mixing at least one of a preservative at a prescribed amount; mixing an amount of a chelate substance by weight of the milk-based fertilizer composition whereby the chelate substance is a combination of a fulvic acid, a coal dust, and a soluble coal dust
   wherein the milk-based fertilizer composition contains Nitrogen, Phosphorus, Potassium, and Calcium and whereby the milk-based fertilizer composition further contains proteins, urea nitrogen, and at least one mineral.

12. The milk-based fertilizer composition of claim 11 further comprising a seaweed powder comprising between 5 and 10 percent by weight of the milk-based fertilizer composition whereby a performance of the milk-based fertilizer composition as measured by a crop yield is increased.

13. The milk-based fertilizer composition of claim 12 wherein the seaweed powder is selected from a group consisting of a red marine alga, a green marine alga, and a brown marine alga.

14. The milk-based fertilizer composition of claim 11 further comprising an additive of at least one L-Amino Acid whereby a performance of the milk-based fertilizer composition as measured by a crop yield is increased.

15. The milk-based fertilizer composition of claim 14 whereby the at least one L-Amino Acid is selected from a group consisting of L-Aspartic Acid, L-Threonine, L-Serine, L-Glutamic Acid, L-Proline, Glycine, L-Alanine, L-Cystine, L-Valine L-Methionine, L-Isoleucine, L-Leucine, L-Tyrosine, L-Phenylalanine, L-Lysine, L-Histidine and L-Arginine.

16. The milk-based fertilizer composition of claim 11 further comprising a soil microbe comprising between 0 and 2 percent by weight of the milk-based fertilizer composition whereby a performance of the milk-based fertilizer composition as measured by a crop yield is increased.

17. The milk-based fertilizer composition of claim 16 wherein the soil microbe is selected from a group consisting of *Bacillus megaterium, Bacillus subtilis, Bacillus licheniformis, Bacillus simplex, Brasiliense*, N-FIXING Microbes, *Bacillus pumilus, Bacillus amyloliquefaciens Streptomyces lydicus*, and *Trichoderma harzianum*.

18. A milk-based fertilizer composition of claim 11 further containing urea nitrogen and at least one mineral whereby a performance of the milk-based fertilizer composition as measured by a crop yield is increased.

19. The milk-based fertilizer composition of claim 18 wherein the at least one mineral is selected from a group consisting of sulfur, cobalt, iron, sodium, copper, manganese, magnesium, molybdenum, and zinc.

20. The milk-based fertilizer composition of claim 11 wherein the defatting process is selected from a group consisting of defatting the milk with a centrifuge and defatting the milk with a cream separation machine.

21. A milk-based fertilizer composition prepared by a process comprising: removing any amount of a fat with a defatting process from a quantity of a milk, obtained from a ruminant animal, to make an amount of skim milk a main nutrient ingredient, the skim milk comprising between 40 and 97 percent by weight of the milk-based fertilizer composition; adding an amount of a citric acid to the skim milk, the amount of citric acid consists essentially of 3 percent by weight of the milk-based fertilizer composition; mixing an amount of a chelate substance by weight of the milk-based fertilizer composition whereby the chelate substance is a combination of a fulvic acid and combination of a coal dust, a soluble coal dust, and a humic acid
   wherein the milk-based fertilizer composition contains Nitrogen, Phosphorus, Potassium, and Calcium and whereby the milk-based fertilizer composition further contains proteins, urea nitrogen, and at least one mineral.

\* \* \* \* \*